United States Patent [19]
Schreiber

[11] Patent Number: 5,365,419
[45] Date of Patent: Nov. 15, 1994

[54] SWITCHING DC CONVERTER

[75] Inventor: Harald Schreiber, Salzkotten, Germany

[73] Assignee: Siemens Aktiengesellschaft, Munich, Germany

[21] Appl. No.: 28,276

[22] Filed: Mar. 9, 1993

[30] Foreign Application Priority Data

Mar. 9, 1992 [EP] European Pat. Off. ........ 92104029.1

[51] Int. Cl.$^5$ .......................................... H02M 3/335
[52] U.S. Cl. ...................................... 363/16; 323/282
[58] Field of Search ................. 363/16; 323/259, 263, 323/265, 282, 349

[56] References Cited

U.S. PATENT DOCUMENTS

| | | | |
|---|---|---|---|
| 4,034,280 | 7/1977 | Cronin et al. | 363/25 |
| 4,355,352 | 10/1982 | Bloom et al. | 363/16 |
| 4,559,590 | 12/1985 | Davidson | 363/21 |
| 4,588,906 | 5/1986 | Taylor | 307/270 |
| 4,636,711 | 6/1987 | Freymuth | 323/282 |
| 4,652,809 | 3/1987 | Barn | 323/282 |
| 4,999,568 | 3/1991 | Gulczynski | 323/351 |
| 5,122,728 | 6/1992 | Ashley | 323/282 |
| 5,126,931 | 6/1992 | Jitaru | 363/21 |
| 5,245,520 | 9/1993 | Imbertson | 363/17 |

FOREIGN PATENT DOCUMENTS

| | | | |
|---|---|---|---|
| 2466805 | 4/1981 | France | 363/16 |
| 0405590 | 8/1985 | Germany | 363/16 |

OTHER PUBLICATIONS

Elektronik, Nr. 26, 27, Dec., 1985, Munchende Seiten 57–59, "Aufwarta-/Abwarts-Schaltregler".

Electronics Engineers' Handbook, 3rd Edition, D. Fink editor, pp. 15-60 to 15-77, McGraw-Hill (1989).

Primary Examiner—Emanuel T. Voeltz
Assistant Examiner—Matthew Nguyen
Attorney, Agent, or Firm—Hill, Steadman & Simpson

[57] ABSTRACT

A buck type switching DC converter having coupled thereto a square-wave signal generator that modulates the pulse width of the control signal for the regulating switch depending on the output voltage of the DC converter given a fixed frequency, the square-wave signal generator being dynamically and selectively directly coupled to the control input of the regulating switch, for example, via a parallel circuit comprising a capacitor and an additional controllable switch.

17 Claims, 1 Drawing Sheet

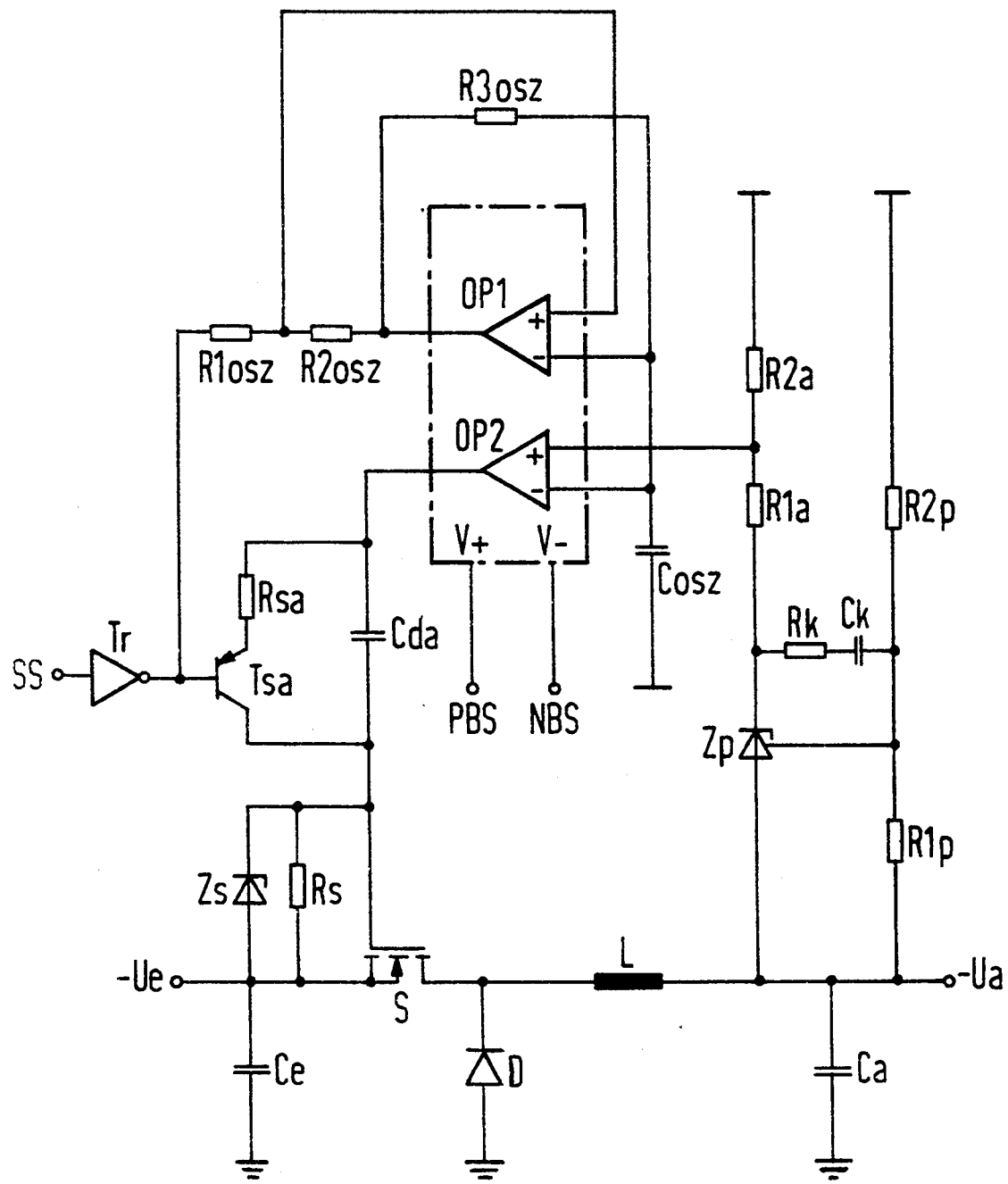

SWITCHING DC CONVERTER

BACKGROUND OF THE INVENTION

The invention is generally directed to switching DC converters. More specifically, the invention is directed to switching DC converters based on the forward converter principle, i.e., buck converters.

The necessity of generating a stable negative voltage of, for example, −40 volts from what is in turn again a negative voltage of, for example, −53 volts frequently arises in switching technology.

Downward (step-down) switching regulators are known for the downward adjustment of a voltage. These regulators generally operate, for example, according to the forward, or flow-through, converter principle (i.e., a buck converter). Such switching regulators are described in, among other things, *Elektronik* 26, 1985, pages 57 through 59, particularly FIG. 1a. See, also, *Electronics Engineers' Handbook*, 3rd Edition, D. Fink editor, pp. 15–60 to 15–77, McGraw-Hill (1989), incorporated herein by reference. These switching regulators are based on a system wherein the negative pole is connected to ground.

Integrated circuits for driving the regulating switch in such switching regulators are available for this configuration. By contrast, there are no integrated circuits for driving the regulating switch in switching regulators for systems whose positive pole is connected to ground.

SUMMARY OF THE INVENTION

The invention provides a switching DC converter of the buck converter type that operates with a high degree of electrical efficiency, is suitable for systems having their positive pole at ground, and can be constructed with little outlay for component parts for the drive of the regulating switch.

To this end, in an embodiment, the invention provides a switching DC converter, comprising a regulating switch, a freewheeling diode and an LC filter, operatively coupled together to form a buck converter and a square-wave signal generator that modulates the pulse width of a control pulse for the regulating switch depending on an output voltage of the DC converter, given a fixed frequency, that is dynamically and statically coupled to a control input of the regulating switch, preferably via a parallel circuit comprised of a capacitor and an additional controllable switch.

In this configuration, a maximum electrical efficiency is achieved because the pulse width of the square-wave signal that controls the regulating switch can be regulated between 0 and 100%. As a result, a battery powered DC converter can still work down to a discharge final voltage of 42 volts under, for example, the conditions mentioned above. Further, the regulation of a negative voltage from a negative voltage is also possible given a suitable selection of the regulating switch of the DC converter. The drive circuit for this switch can thereby be constructed with relatively new component parts.

In an embodiment of the invention, the positive pole of the switching DC converter is connected to ground.

In an embodiment of the invention, a clamp circuit that limits the switching voltages at the control input of the first switch is coupled between the control input of the switch and the input of the converter.

In an embodiment of the invention, a Zener diode circuit having a programmable Zener diode is coupled between the output of the DC converter and the input of the square-wave signal generator and provides a reference variable input for the pulse-width-modulation of the square-wave signal generator which has a proportional relationship to the output voltage of the DC converter.

In an embodiment of the invention, the Zener diode circuit has a frequency compensation circuit coupled across the programmable Zener diode.

In an embodiment of the invention, the square-wave signal generator comprises an operatively coupled oscillator and a comparator each respectively having an operational amplifier.

In an embodiment of the invention, an output of the oscillator is connected to the control input of the additional switch.

In an embodiment of the invention, a driver circuit is connected onto the connection between the output of the oscillator and the control input of the additional switch for imposing a given potential on an external control signal supplied to the control input of the additional switch.

A DC converter including such features can be easily switched on and off via a driver circuit by disconnecting and connecting the operating point of the oscillator given a simultaneously corresponding inhibit or enable of the static drive path for the regulating switch formed by the additional switch. The start-up of the oscillator thereby ensues without problems. Further, a prescribed output voltage to be regulated can be set by the circuit having a programmable Zener diode. A frequency compensation can likewise be undertaken.

These and other features and advantages of the invention are set forth below in greater detail in the following detailed description of the presently preferred embodiments and the accompanying drawing.

BRIEF DESCRIPTION OF THE DRAWING

The FIGURE illustrates a buck type switching DC converter embodying principles of the invention.

DETAILED DESCRIPTION OF THE PRESENTLY PREFERRED EMBODIMENT OF THE INVENTION

As discussed above, the present invention provides a DC converter including a buck converter having connected thereto a square-wave signal generator arrangement for driving the regulating switch of the buck converter, the output of the square-wave signal generator being dynamically coupled to the regulating switch, for example, capacitatively, as well as statically, for example, selectively directly coupled to the switch via a controllable switch.

In the Figure, the illustrated DC converter comprises an input capacitor Ce, a regulating switch S, a freewheeling diode D, a storage inductor L and an output capacitor Ca. The functioning of that much of such a DC converter is well known and shall therefore not be set forth in detail here. See, *Electronics' Engineer Handbook*, identified above for further background information.

The illustrated DC converter can be designed for generating a rectified, stabilized, negative output voltage −Ua, for example −40 volts, from a rectified, negative input voltage −Ue, for example −53 volts. To that end, the positive pole of the input, or respectively, output voltage is thereby coupled to ground.

The corresponding input voltage −Ue is supplied via the input capacitor Ce, whereas the corresponding output voltage −Ua is taken from the output capacitor Ca.

The regulating switch S of the DC converter preferably is an n-channel MOS field effect transistor. The drive for the switch S is provided by means of a square-wave signal generator that modulates the pulse width of the control pulse applied to the control input of the switch S depending on the output voltage −Ua, given a fixed frequency. This square-wave signal generator is connected to the control input of the switch S via a parallel circuit composed of a capacitor Cda and an additional switch Tsa connected in series with a resistor Rsa. As will be appreciated, the capacitor Cda dynamically and capacitatively couples the signal output by the square-wave signal generator to the regulating switch control input. The switch Tsa statically, i.e., selectively and directly couples the output signal to the regulating switch control input.

The square-wave signal generator is formed by the operational amplifiers OP1 and OP2, by the capacitor Cosz and by the resistors R1osz, R2osz and R3osz. The square-wave signal generator is thereby in turn subdivided into an oscillator formed by the operational amplifier OP1, the capacitor Cosz and the resistors R1osz, R2osz and R3osz, and into a comparator formed by the operational amplifier OP2. For example, a double operational amplifier module that is operated with a positive operating voltage PBS and with a negative operating voltage NBS at the inputs +V or −V, respectively, of, for example, +5 volts or −5 volts, respectively, can be employed for the operational amplifiers OP1 and OP2. These voltages are generally always present in a system, so that they need not be specially produced.

The output of the oscillator is connected to the control input of the additional switch Tsa. The oscillator itself is utilized as a delta/square-wave generator. The delta signal as well as a DC voltage signal proportional to the output voltage −Ua of the DC converter are supplied to the comparator, at whose output a pulse-width-modulated square-wave signal having an amplitude of, for example, 6 through 8 volts peak-to-peak can be taken. The DC signal proportional to the output voltage −Ua represents a reference variable input for the regulation of the pulse width of the square-wave signal generated by the square-wave signal generator. For overcoming the difference in potential at the switch S, this signal is capacitively dynamically coupled via the capacitor Cda onto the gate electrode serving as a control input for the switch S.

A clamp circuit composed of a Zener diode Zs and a resistor Rs connected parallel is coupled between the control input and the switching path input of switch S (the input of the converter). This clamp circuit limits the drive signal of the switch S at the gate electrode to, for example, values between −0.6 and +6.8 volts. The resistor Rs thereby serves to inhibit the switch S in phases when it is not driven.

The series circuit composed of the additional switch Tsa and the resistor Rsa and connected parallel to the capacitor Cda carries out a static drive of the switch S parallel to the dynamic drive supplied via the capacitor Cda. The additional switch Tsa is thereby connected in base circuitry. No phase rotation occurs. As a result of the static drive of the switch S, the pulse width of the drive signal can be varied from 0 through 100%.

Given an output voltage −Ua of −40 volts and a 48 volt emergency battery, the DC converter can thus work down to a final discharge voltage of 42 volts for the battery.

The DC converter can also be turned off in a simple way by disconnecting the operating point of the oscillator and by inhibiting the static drive path. This can occur via a driver circuit TR that is supplied with a corresponding control voltage SS and is connected to the connection between the output of the oscillator and the control input of the additional switch Tsa. For example, a potential of +5 volts can be imposed on this connection, as a result whereof the DC converter then is shut off. The DC converter is switched on given a potential of 0 volts.

As will be appreciated, the loop gain of the control circuit is composed of the gain of the square-wave signal generator, of the switch S and of a programmable Zener diode Zp. The programmable Zener diode Zp is located in a Zener diode circuit composed of the resistors R1p and R2p in addition to the programmable Zener diode Zp. The Zener diode circuit is arranged between the output of the DC converter and the input of the square-wave signal generator and produces the reference variable input for the pulse-width-modulated square-wave signal generator dependent on the output voltage −Ua of the DC converter. The resistors R1a and R1b thereby serve the purpose of matching.

The path of the DC converter is formed by the LC filter having the storage inductor L and the output capacitor Ca and the load.

Additionally, a frequency compensation can be implemented by a feedback series circuit composed of resistor Rk and a capacitor Ck in the wiring of the programmable Zener diode Zp.

Although modifications and changes may be suggested by those skilled in the art, it is the intention of the inventors to embody within the patent warranted hereon all changes and modifications as reasonably and properly come within the scope of their contribution to the art.

I claim:

1. A switching DC converter, comprising:
   a regulating switch, a freewheeling diode and an LC filter operatively coupled together to form a buck converter;
   a square-wave signal generator operatively coupled to the regulating switch that modulates a pulse width of a control pulse signal depending on an output voltage of the DC converter, and given a fixed frequency, that is dynamically and selectively directly coupled to a control input of the regulating switch; and
   a Zener diode circuit having a programmable Zener diode, which circuit is coupled between an output of the DC converter and an input of the square-wave signal generator and is configured to generate a variable reference input for pulse-width-modulation of the square-wave signal generator that has a proportional relationship to the output voltage of the DC converter.

2. The switching DC converter of claim 1, comprising a parallel circuit comprising a capacitor and an additional switch couples the control pulse signal to the regulating switch control input.

3. The switching DC converter of claim 1, having a positive pole connected to ground.

4. The switching DC converter of claim 1, wherein a clamp circuit that limits the voltage of the control pulse signal at the control input of the regulating switch is coupled between the control input of the switch and an input of the converter.

5. The switching DC converter of claim 1, wherein the Zener diode circuit has a frequency compensation circuit coupled across the programmable Zener diode.

6. The switching DC converter of claim 1, wherein the square-wave signal generator comprises an operatively coupled oscillator and a comparator each respectively having an operational amplifier.

7. The switching DC converter of claim 6, further comprising a parallel circuit comprising a capacitor and an additional switch couples the control pulse signal to the regulating switch control input and wherein an output of the oscillator is connected to a control input of the additional switch.

8. The switching DC converter of claim 7, wherein a driver circuit is connected onto the connection between the output of the oscillator and the control input of the additional switch for imposing a given potential on an external control signal supplied to the control input of the additional switch.

9. A DC switching converter having input and output negative voltages, comprising:
an input and an output;
a controllable regulating switch coupled between the input and the output and having a control input;
an LC filter coupled between the regulating switch and the output;
a freewheel diode having a cathode end coupled between the switch and the LC filter and another anode end coupled to ground;
a square-wave signal generator coupled between the output and the control input of the controlled switch, the square-wave signal generator providing a control pulse to the controllable switch;
a parallel circuit comprising an additional switch and a capacitor coupling the square-wave signal generator to the control input of the regulating switch; and
a Zener diode circuit having a programmable Zener diode, which circuit is coupled between the output of the DC converter and an input of the square-wave signal generator and is configured to generate a variable reference input for pulse-width-modulation of the square-wave signal generator that has a proportional relationship to the output voltage DC converter.

10. The switching DC converter of claim 9, wherein a clamp circuit that limits the voltage of the control pulse signal at the control input of the regulating switch is coupled between the control input of the switch and the input of the converter.

11. The switching DC converter of claim 9, wherein the Zener diode circuit has a frequency compensation circuit coupled across the programmable Zener diode.

12. The switching DC converter of claim 9, wherein the square-wave signal generator comprises an operatively coupled oscillator and a comparator each respectively having an operational amplifier.

13. The switching DC converter of claim 10, wherein an output of the oscillator is connected to a control input of the additional switch.

14. A switching DC converter, comprising:
a buck type converter configuration having a controllable switch, a freewheel diode and output LC filter;
a square-wave signal generator operatively coupled to drive the controllable switch by generating a square-wave signal thereto;
means for capacitively coupling the square-wave signal to the controllable switch;
means for selectively directly coupling the square-wave signal to the controllable switch; and
a Zener diode circuit having a programmable Zener diode, which circuit is coupled between an output of the DC converter and an input of the square-wave signal generator and is configured to generate a variable reference input for pulse-width-modulation of the square-wave signal generator that has a proportional relationship to the output voltage of the DC converter.

15. The switching DC converter of claim 14, having a positive pole connected to ground.

16. The switching DC converter of claim 14, wherein a clamp circuit that limits the voltage of the control pulse signal at a control input of the controllable switch is coupled between the control input of the switch and an input of the converter.

17. The switching DC converter of claim 14, wherein the square-wave signal generator comprises an operatively coupled oscillator and a comparator each respectively having an operational amplifier.

* * * * *